US012633643B2

(12) United States Patent
Kim et al.

(10) Patent No.: US 12,633,643 B2
(45) Date of Patent: May 19, 2026

(54) SUPPORT POLE ASSEMBLY FOR MSVOUNTING ANTENNA

(71) Applicant: KMW INC., Hwaseong-si (KR)

(72) Inventors: Duk Yong Kim, Yongin-si (KR); Chi Back Ryu, Hwaseong-si (KR); Min Sik Park, Hwaseong-si (KR); Kyo Sung Ji, Hwaseong-si (KR); In Ho Kim, Yongin-si (KR); Sang Hyo Kang, Hwaseong-si (KR); Min Soo Kim, Hwaseong-si (KR); Hee Kim, Osan-si (KR); Young Ji Hong, Daejeon (KR)

(73) Assignee: KMW INC., Hwaseong-si (KR)

( * ) Notice: Subject to any disclaimer, the term of this patent is extended or adjusted under 35 U.S.C. 154(b) by 16 days.

(21) Appl. No.: 18/398,305

(22) Filed: Dec. 28, 2023

(65) Prior Publication Data

US 2024/0128630 A1 Apr. 18, 2024

Related U.S. Application Data

(63) Continuation of application No. PCT/KR2022/008839, filed on Jun. 22, 2022.

(30) Foreign Application Priority Data

Jun. 29, 2021 (KR) ........................ 10-2021-0085172
Jun. 22, 2022 (KR) ........................ 10-2022-0075938

(51) Int. Cl.
*H01Q 1/12* (2006.01)
*H01Q 1/02* (2006.01)

(52) U.S. Cl.
CPC ............. *H01Q 1/1242* (2013.01); *H01Q 1/02* (2013.01)

(58) Field of Classification Search
CPC ...... H01Q 1/1242; H01Q 1/02; H01Q 1/1214; H01Q 1/246; E04H 12/00; F16B 5/02; G09F 15/00
See application file for complete search history.

(56) References Cited

U.S. PATENT DOCUMENTS 9,209,523 B2 * 12/2015 Ma ........................... H01Q 1/42
10,347,979 B1 * 7/2019 Boyle .................. H01Q 1/1228
(Continued)

FOREIGN PATENT DOCUMENTS

EP 3514983 A1 7/2019
KR 10-2018-0043707 A 4/2018
(Continued)

OTHER PUBLICATIONS

International Search Report mailed Oct. 4, 2022 for International Application No. PCT/KR2022/008839 and its English translation.
(Continued)

*Primary Examiner* — Awat M Salih

(57) ABSTRACT

The present invention relates to a support pole assembly for mounting an antenna and, particularly, to a support pole assembly for mounting an antenna, comprising: a support pole which is formed in a hollow structure and has an antenna device mounting hole formed at the circumferential surface thereof; an antenna device which is mounted to the support pole while passing through and covering the antenna device mounting hole and the rear portion of which is placed in the inner space of the support pole. Accordingly, the present invention provides an advantage in that the protrusion amount of the antenna device with respect to the support pole is reduced and thus the space required for mounting the antenna device can be reduced.

11 Claims, 7 Drawing Sheets

1

(56) References Cited

U.S. PATENT DOCUMENTS

| | | | | |
|---|---|---|---|---|
| 2010/0026604 | A1 * | 2/2010 | Caldwell .............. | H01Q 1/1242 343/890 |
| 2012/0256810 | A1 | 10/2012 | Caldwell et al. | |
| 2017/0214113 | A1 | 7/2017 | Norrell et al. | |
| 2018/0254545 | A1 | 9/2018 | Hendrix et al. | |
| 2019/0261456 | A1 * | 8/2019 | Lee ...................... | H01Q 1/1242 |

FOREIGN PATENT DOCUMENTS

| | | | |
|---|---|---|---|
| WO | 2013/123907 | A1 | 8/2013 |
| WO | 2018-153261 | A1 | 8/2018 |

OTHER PUBLICATIONS

Extended European Search Report mailed on Apr. 25, 2025 from the European Patent Office for Application No. 22833492.6.

* cited by examiner

[FIG. 1]
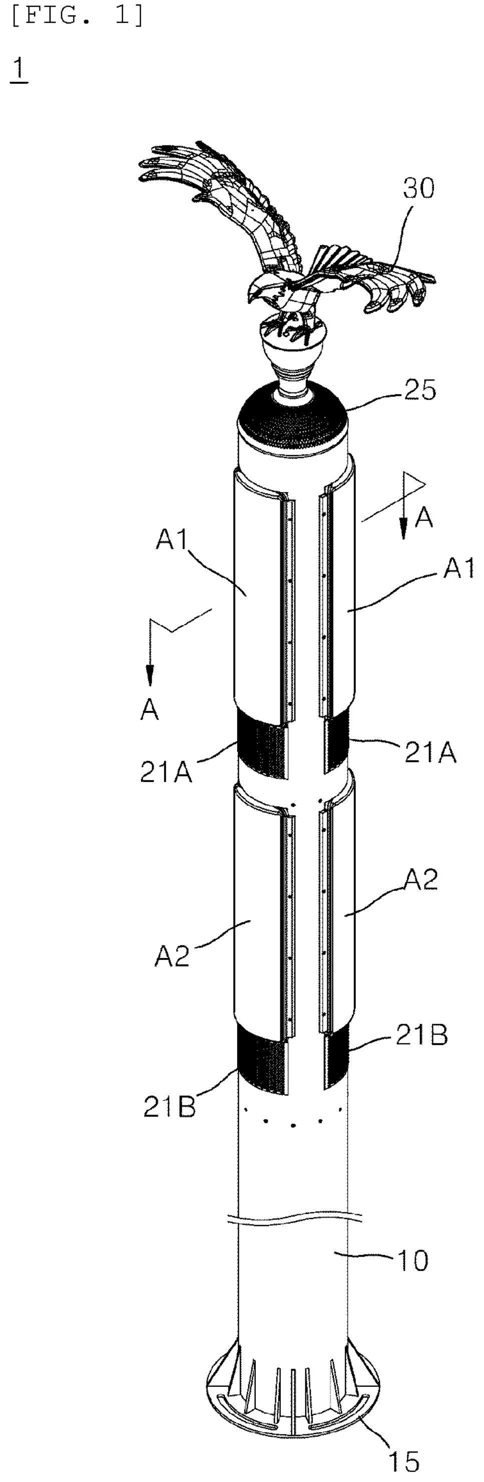

[FIG. 2]
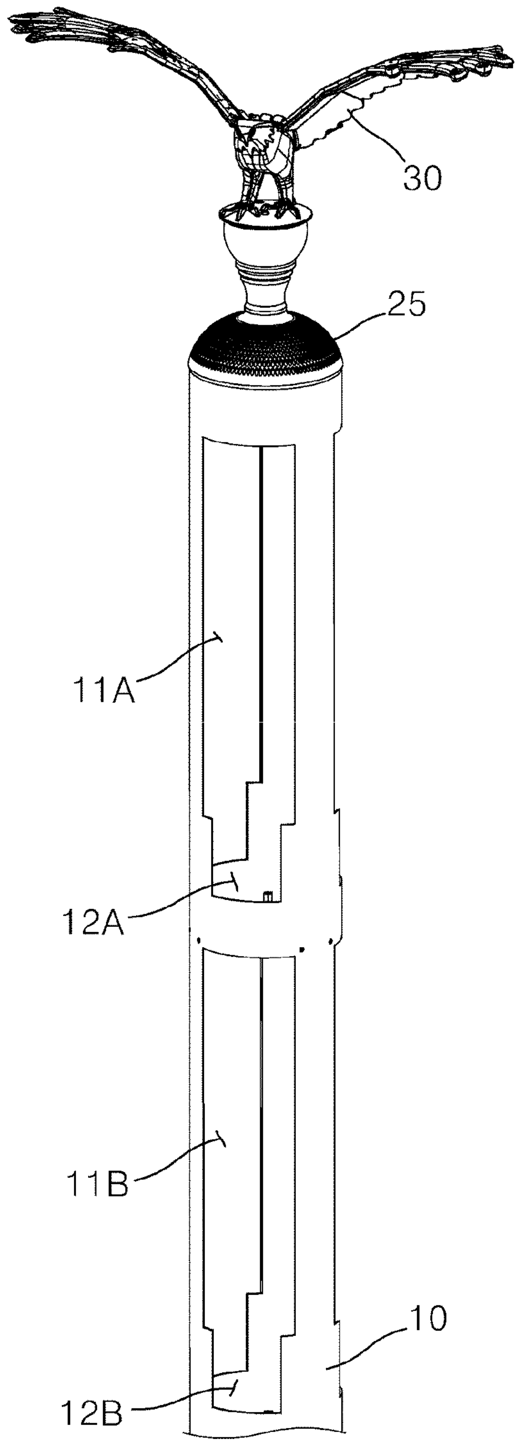

[FIG. 3]
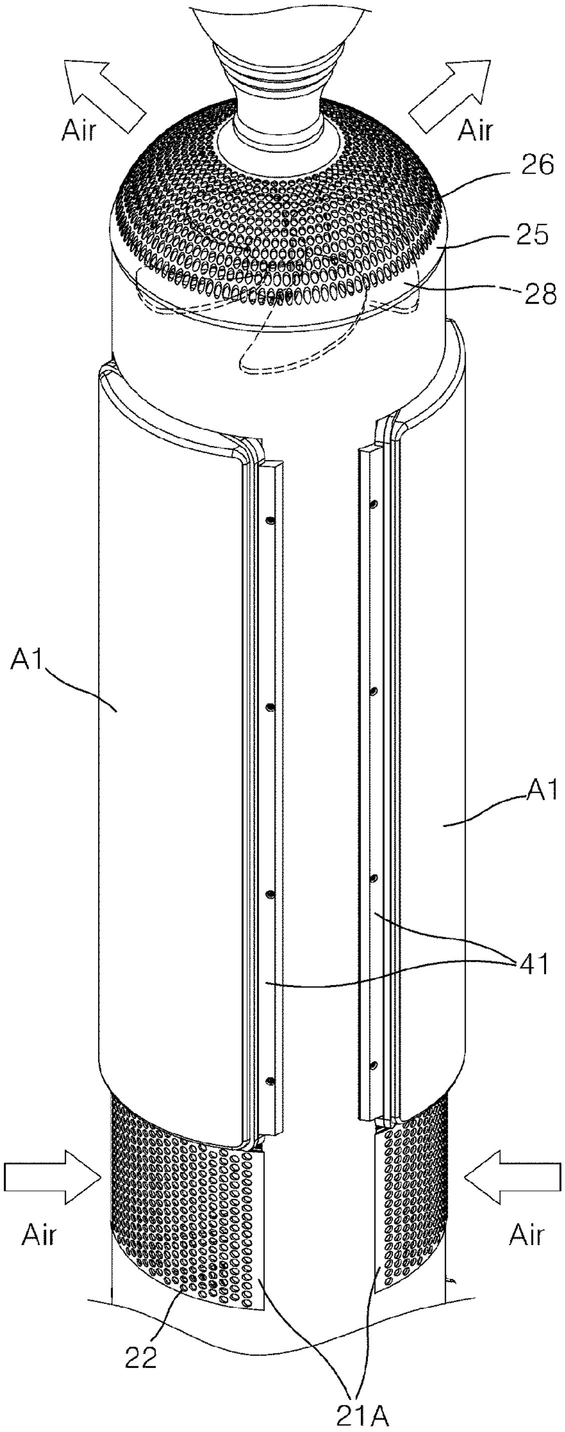

[FIG. 4]
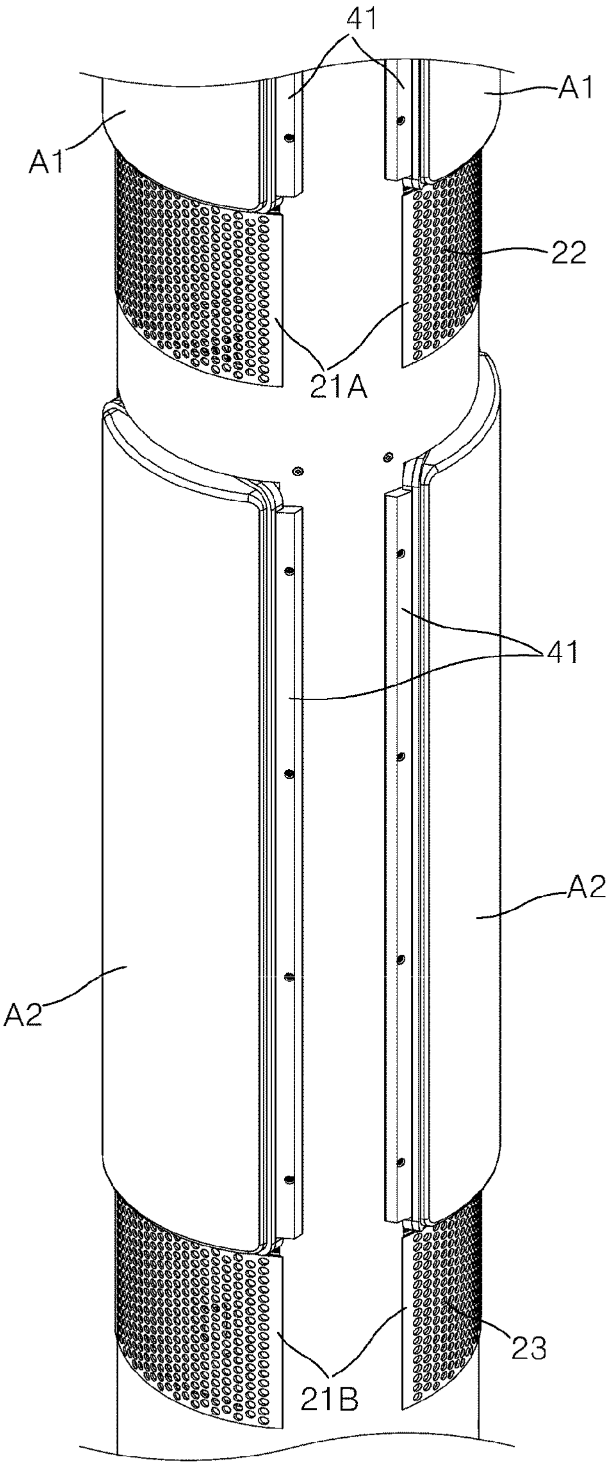

[FIG. 5]
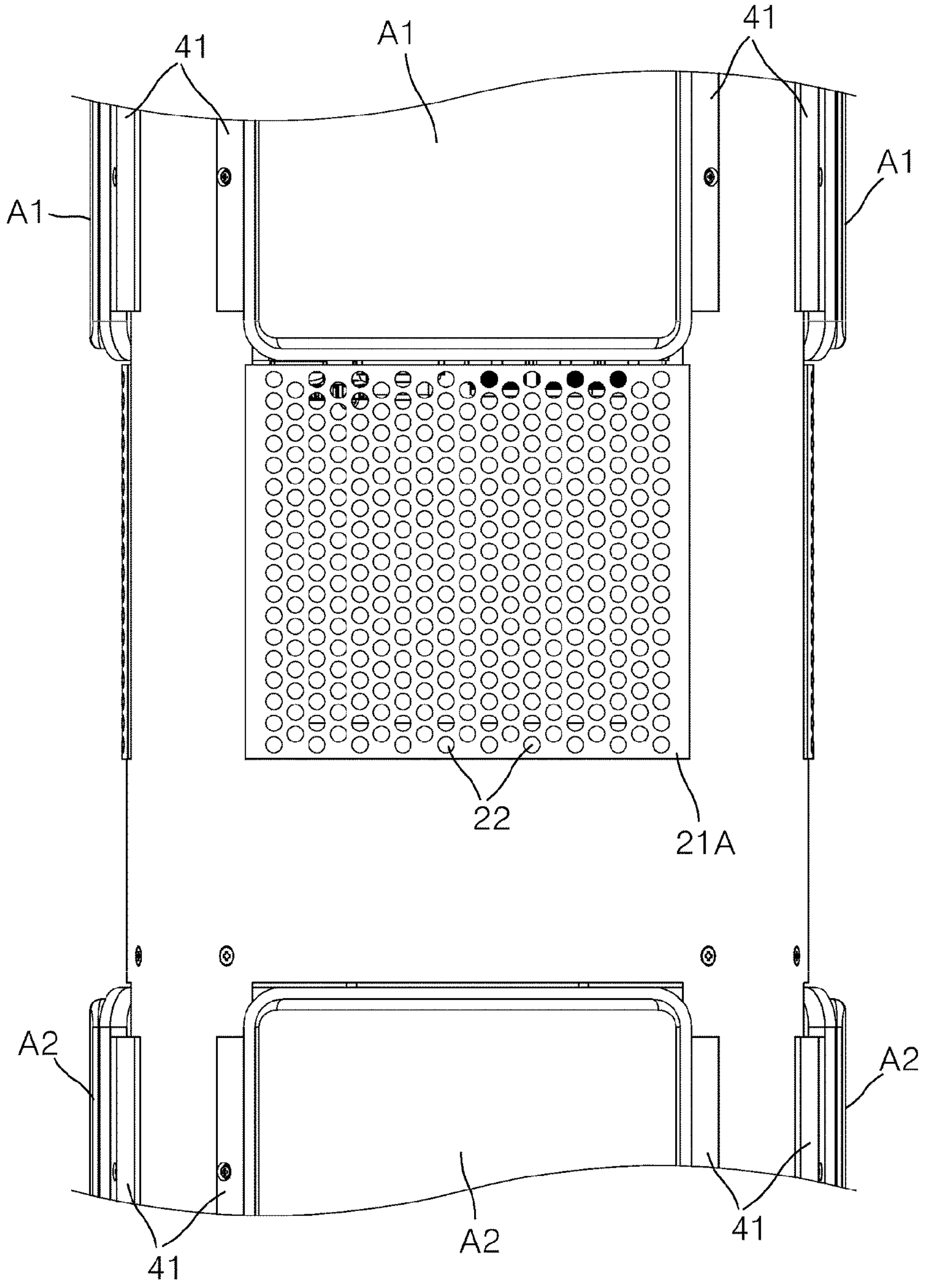

[FIG. 6]
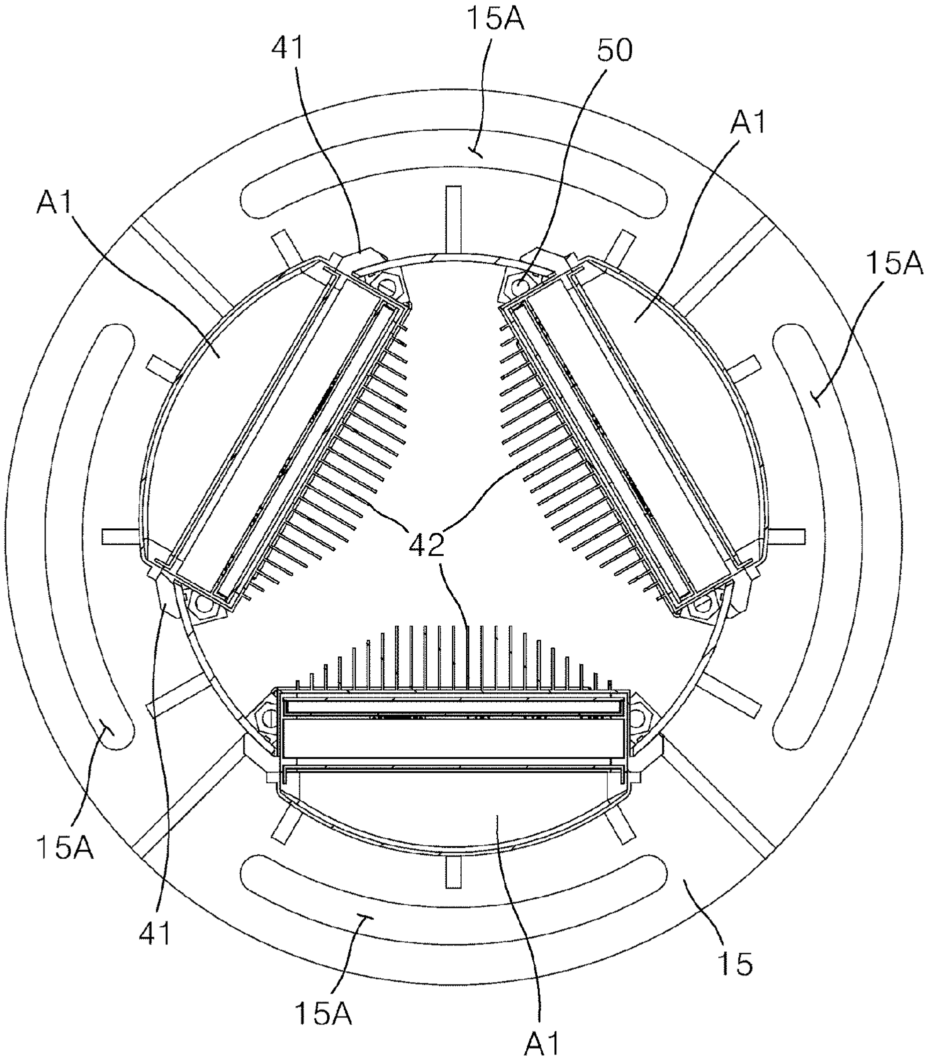

[FIG. 7]
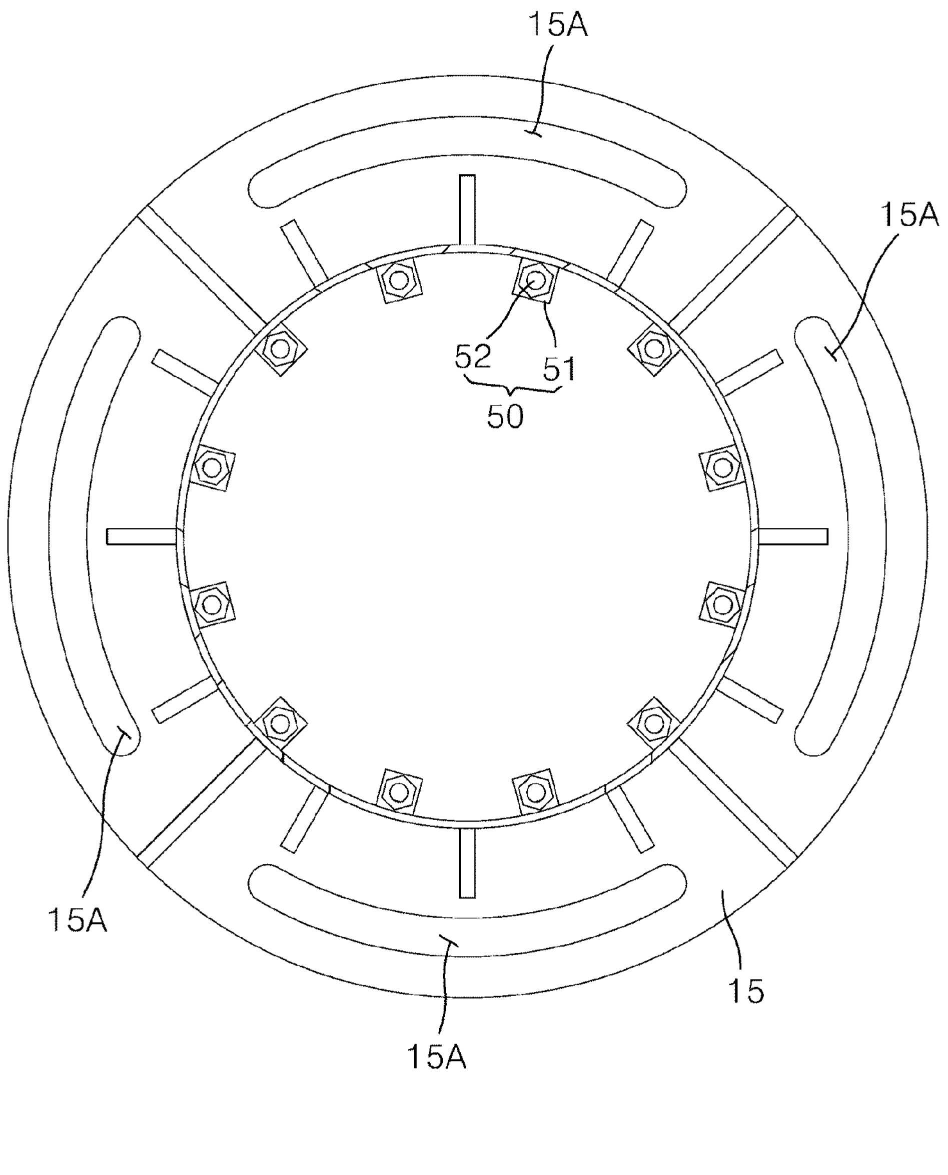

SUPPORT POLE ASSEMBLY FOR MSVOUNTING ANTENNA

CROSS-REFERENCE TO RELATED APPLICATIONS

This application is a continuation application of International Application No. PCT/KR2022/008839, filed Jun. 22, 2022, which claims the benefit of Korean Patent Application Nos. 10-2021-0085172, filed Jun. 29, 2021; and 10-2022-0075938, filed Jun. 22, 2022, in the Korean Intellectual Property Office, the disclosures of which are incorporated herein in their entirety by reference.

TECHNICAL FIELD

The present disclosure relates to a support pole assembly for antenna installation, and more specifically, to a support pole assembly for antenna installation in which by mounting a support pole on an antenna device so that a rear portion of the antenna device is disposed in an internal space of the support pole to reduce the amount of protrusion of the antenna device, it is possible to reduce an installation space of the antenna device and improve the beauty of the entire exterior.

BACKGROUND ART

A wireless communication technology, for example, a multiple input multiple output (MIMO) technology is a technology that dramatically increases data transmission capacity using a plurality of antennas and a spatial multiplexing technique in which a transmitter transmits different data through each transmit antenna and a receiver separates the transmitted data through appropriate signal processing.

Therefore, as the number of transmitting and receiving antennas increases simultaneously, a channel capacity increases and thus more data may be transmitted. For example, when the number of antennas is increased to 10, about 10 times the channel capacity is secured using the same frequency band compared to a current single antenna system.

4G LTE-advanced uses up to 8 antennas, and products equipped with 64 or 128 antennas are currently being developed in the pre-5G stage, and base station equipment with a much larger number of antennas is expected to be used in 5G, which is called a massive MIMO technology. While a current cell operation is a 2-dimension, when the massive MIMO technology is introduced, 3D-beamforming becomes possible, which is also called an FD-MIMO (full dimension).

In the massive MIMO technology, as the number of antennas increases, the number of transmitters and filters also increases. Nevertheless, due to lease costs or spatial constraints at installation positions, the reality is that RF components (antenna/filter/power amplifier/transceiver, and the like) are made smaller, lighter, and cheaper, and the massive MIMO requires a high output to expand a coverage, and power consumption and heat generation due to such high output are acting as negative factors in reducing a weight and a size.

In particular, when an MIMO antenna in which modules implemented with RF devices and digital devices are coupled in a stacked structure is installed in a limited space, the need for a compacted and miniaturized design for a plurality of layers constituting the MIMO antenna in order to maximize the ease of installation or spatial utilization is emerging, and there is a strong demand for free direction control of an antenna device installed on one support pole.

Meanwhile, since the antenna device is installed on the support pole through a connecting arm and disposed to protrude from the support pole, an installation space of the antenna device should be sufficiently secured, and thus there is a problem in that the cost corresponding to a space of the antenna device should be paid to an installation space supplier, thereby increasing the cost burden.

In addition, as a plurality of antenna devices are installed intensively on the support pole, the wiring becomes complicated, and a plurality of heat sink fins formed on a rear portion of the antenna device for heat radiation are exposed to the outside, resulting in a problem that the antenna does not look good.

In addition, since various power cables for power supply to the antenna device are exposed to the outside of the support pole, there is a problem in that not only does the antenna device not look good, but also, when a power outage occurs due to external factors such as bad weather, the power supply to the antenna device is stopped due to damage to the power cables to paralyze a function of the antenna device.

Technical Problem

The present disclosure is directed to providing a support pole assembly for antenna installation, which can reduce an installation space of an antenna device by reducing the amount of protrusion of the antenna device with respect to the support pole when the antenna device is installed on the support pole.

The present disclosure is also directed to providing a support pole assembly for antenna installation in which a plurality of heat sink pins formed on a rear portion of an antenna device for heat radiation are not exposed to the outside of the support pole.

The present disclosure is also directed to providing a support pole assembly for antenna installation, which can make an exterior beautiful and prevent a power outage of an antenna device due to external factors such as bad weather by arranging a wire harness for supplying power to the antenna device and controlling the same inside a support pole.

Objects of the present disclosure are not limited to the above-described objects, and other objects that are not mentioned will be able to be clearly understood by those skilled in the art from the following description.

Technical Solution

In order to achieve the objects, a support pole assembly for antenna installation is composed of a support pole and an antenna device. The support pole is formed in a hollow structure. An antenna device installation hole is formed in a circumferential surface of the support pole. The antenna device is installed on the support pole by passing through the antenna device installation hole and covering the antenna device installation hole. A rear portion of the antenna device is disposed in an internal space of the support pole.

Here, a plurality of heat sink fins may be formed to protrude from the rear portion of the antenna device.

In addition, an intake panel installation hole may be further formed in the circumferential surface of the support pole. An intake panel may be further installed on the support pole. A plurality of intake holes may be formed in the intake panel. The intake panel may cover the intake panel installation hole.

In addition, the intake panel installation hole may be formed under the antenna device installation hole.

In addition, the intake panel installation hole may be formed to extend from the antenna device installation hole.

In addition, an exhaust panel may be further installed above the antenna device in the support pole. A plurality of exhaust holes may be formed in the exhaust panel.

In addition, the exhaust panel may be installed on an upper end of the support pole and may cover an upper opening of the support pole.

In addition, an exhaust fan may be further installed above the antenna device in the support pole. The exhaust fan may send air in the support pole to the exhaust panel.

In addition, a wire harness connected to the antenna device may be installed in the internal space of the support pole.

In addition, a harness clamper configured to clamp and arrange the wire harness may be formed to protrude from an inner circumferential surface of the support pole.

In addition, the harness clamper may be composed of a base plate and a clamping protrusion. The base plate may be formed to protrude toward a center of the support pole from the inner circumferential surface of the support pole. The clamping protrusion may be disposed to protrude upward from the base plate. The wire harness may be clamped and arranged around the clamping protrusion.

In addition, screw assembly panels fastened to the support pole by a screw may be provided at both sides of the antenna device.

In addition, the antenna device installation hole may be formed as a plurality of antenna device installation holes spaced apart from each other in a circumferential direction of the support pole. The antenna device may be provided as a plurality of antenna devices each installed in one of the plurality of antenna device installation holes.

In addition, the plurality of antenna device installation holes may include a plurality of upper antenna device installation holes and a plurality of lower antenna device installation holes. The plurality of upper antenna device installation holes may be spaced apart from each other in the circumferential direction of the support pole. The plurality of lower antenna device installation holes may be disposed under the plurality of upper antenna device installation holes. The plurality of lower antenna device installation holes may be spaced apart from each other in the circumferential direction of the support pole. The plurality of antenna devices may include a plurality of upper antenna devices and a plurality of lower antenna devices. Each of the plurality of upper antenna devices may be installed in one of the plurality of upper antenna device installation holes. Each of the plurality of lower antenna devices may be installed in one of the plurality of lower antenna device installation holes.

In addition, at least one of a local advertising emblem, an advertising panel, a road information board, a traffic light, and a streetlight may be further installed on the support pole.

Detailed matters of other embodiments are included in a detailed description and accompanying drawings.

Advantageous Effects

In the support pole assembly for antenna installation according to the present disclosure, since the antenna device is installed on the support pole by passing through the antenna device installation hole formed in the circumferential surface of the support pole to cover the antenna device installation hole and the rear portion of the antenna device is disposed in the internal space of the support pole, it is possible to reduce the amount of protrusion of the antenna device with respect to the support pole, thereby reducing the installation space of the antenna device.

In addition, in the support pole assembly for antenna installation according to the present disclosure, since the rear portion of the antenna device is disposed in the internal space of the support pole, the plurality of heat sink fins formed on the rear portion of the antenna device for heat radiation are not exposed to the outside of the support pole to make the exterior beautiful.

In addition, in the support pole assembly for antenna installation according to the present disclosure, since the wire harness for supplying power to the antenna device and controlling the antenna device is disposed inside the support pole, it is possible to make the exterior beautiful and prevent the power outage of the antenna device due to the external factors such as bad weather.

Effects of the present disclosure are not limited to the above-described effects, and other effects that are not mentioned will be able to be clearly understood by those skilled in the art from the following description.

DESCRIPTION OF DRAWINGS

FIG. 1 is a perspective view illustrating a support pole assembly for antenna installation according to an embodiment of the present disclosure.

FIG. 2 is a perspective view illustrating a state before an antenna device is installed on an upper portion of the support pole illustrated in FIG. 1.

FIG. 3 is an enlarged perspective view of the upper portion of the support pole illustrated in FIG. 1.

FIG. 4 is an enlarged perspective view of a portion under the portion illustrated in FIG. 3 of the upper portion of the support pole illustrated in FIG. 1.

FIG. 5 is an enlarged front view of the upper portion of FIG. 4.

FIG. 6 is a planar cross-sectional view along line A-A illustrated in FIG. 1.

FIG. 7 is a view illustrating a state in which the antenna device is removed from FIG. 6.

DESCRIPTION OF REFERENCE NUMERALS

A1, A2: antenna devices 41: screw assembly panel
42: heat sink fin 10: support pole
11A, 11B: antenna device installation holes 12A, 12B: intake panel installation holes
21A, 21B: intake panels 22, 23: intake holes
25: exhaust panel 26: exhaust hole
28: exhaust fan 30: additional installation
50: harness clamper 51: base plate
52: clamping protrusion

MODE FOR INVENTION

Hereinafter, a support pole assembly for antenna installation according to embodiments of the present disclosure will be described in detail with reference to the accompanying drawings.

In adding reference numerals to components in each drawing, it should be noted that the same components have the same reference numerals as much as possible even when they are illustrated in different drawings. In addition, in describing embodiments of the present disclosure, the detailed description of related known configurations or functions will be omitted when it is determined that the detailed description obscures the understanding of the embodiments of the present disclosure.

The terms such as first, second, A, B, (a), and (b) may be used to describe components of the embodiments of the present disclosure. The terms are only for the purpose of distinguishing a component from another, and the nature, sequence, order, or the like of the corresponding component is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

FIG. 1 is a perspective view illustrating a support pole assembly for antenna installation according to an embodiment of the present disclosure, FIG. 2 is a perspective view illustrating a state before an antenna device is installed on an upper portion of the support pole illustrated in FIG. 1, FIG. 3 is an enlarged perspective view of the upper portion of the support pole illustrated in FIG. 1, FIG. 4 is an enlarged perspective view of a portion under the portion illustrated in FIG. 3 of the upper portion of the support pole illustrated in FIG. 1, FIG. 5 is an enlarged front view of the upper portion of FIG. 4, FIG. 6 is a planar cross-sectional view along line A-A illustrated in FIG. 1, and FIG. 7 is a view illustrating a state in which the antenna device is removed from FIG. 6.

Referring to FIGS. 1 to 7, a support pole assembly 1 for antenna installation according to an embodiment of the present disclosure may include a support pole 10 and antenna devices A1 and A2.

The support pole 10 may be formed in a vertically long bar shape. The support pole 10 may be formed in a hollow structure. In the present embodiment, the support pole 10 may be formed in a hollow cylindrical shape, but may also be formed in a polygonal cylindrical shape, such as a triangular cylindrical shape or quadrangular cylindrical shape.

An installation plate 15 may be formed to protrude radially from a lower end of the support pole 10. In the present embodiment, since the support pole 10 is formed in a cylindrical shape, the installation plate 15 is formed in a disk shape, but the shape of the installation plate 15 is not limited to being formed in a disk shape and may be formed of a polygonal plate, such as a triangular plate or a quadrangular plate, which has a shape corresponding to the shape of the support pole 10.

Fastening member through holes 15A (see FIGS. 6 and 7) through which an object on which the support pole 10 is fixedly installed is fastened by a fastening member such as a bolt may be formed in the installation plate 15. In other words, the fastening member may be fastened to the object on which the support pole 10 is fixedly installed by passing through the fastening member through hole 15A to fix the support pole 10 to the object. Here, the object on which the support pole 10 is fixedly installed may be installed at various positions, such as the ground, the floor of a building, an upper end of a pole of a traffic light, and an upper end of a pole of a streetlight.

The fastening member through hole 15A may be formed in a long arc shape in a circumferential direction of the installation plate 15. The fastening member through hole 15A may be formed as a plurality of fastening member through holes 15A spaced apart from each other in the circumferential direction of the installation plate 15. In the present embodiment, four fastening member through holes 15A may be formed, but at least one fastening member through hole 15A may be formed.

Meanwhile, an additional installation 30 may be installed on the support pole 10. In the present embodiment, the additional installation 30 is formed as an eagle-shaped emblem installed on an upper end of the support pole 10. However, the additional installation 30 does not necessarily need to be installed on the upper end of the support pole 10 and may be installed to be disposed to protrude to one side of the support pole 10. In addition, the additional installation 30 does not necessarily need to be formed as the eagle-shaped emblem and may be formed as a local advertising emblem symbolizing an area in which the support pole assembly 1 for antenna installation according to the embodiment of the present disclosure is installed.

In other words, the additional installation 30 may be at least one of the local advertising emblem, advertising panels, road information boards, traffic lights, and streetlights. As described above, the support pole assembly 1 for antenna installation according to the embodiment of the present disclosure has an advantage in that it is possible to further increase spatial utilization by installing not only a plurality of antenna devices A but also the additional installation 30 on the support pole 10.

Meanwhile, antenna device installation holes 11A and 11B (see FIG. 2) may be formed on a circumferential surface of the support pole 10. Antenna devices A1 and A2 may be installed on the support pole 10 by passing through the antenna device installation holes 11A and 11B and covering the antenna device installation holes 11A and 11B. Therefore, when the antenna devices A1 and A2 are in a state of being installed on the support pole 10, rear portions of the antenna devices A1 and A2 may be disposed in an internal space of the support pole 10.

As described above, since the rear portions of the antenna devices A1 and A2 are disposed in the internal space of the support pole 10, it is possible to reduce the amounts of protrusion of the antenna devices A1 and A2 with respect to the support pole 10, thereby reducing the installation spaces of the antenna devices A1 and A2.

The antenna device installation holes 11A and 11B may be formed as a plurality of antenna device installation holes 11A and 11B spaced apart from each other in the circumferential direction of the support pole 10. In the present embodiment, the antenna device installation holes 11A and 11B may be formed as three antenna device installation holes 11A and 11B spaced apart from each other in the circumferential direction of the support pole 10. However, the number of antenna device installation holes 11A and 11B is not limited to three and may be two or four or more.

Specifically, the plurality of antenna device installation holes 11A and 11B may include the plurality of upper antenna device installation holes 11A and the plurality of lower antenna device installation holes 11B.

The plurality of upper antenna device installation holes 11A and the plurality of lower antenna device installation holes 11B may be formed in the same number. However, the plurality of upper antenna device installation holes 11A and the plurality of lower antenna device installation holes 11B may be formed in different numbers.

In addition, the plurality of upper antenna device installation holes 11A and the plurality of lower antenna device installation holes 11B may be formed in the same size. However, the plurality of upper antenna device installation holes 11A and the plurality of lower antenna device installation holes 11B may be formed in different sizes.

In addition, the plurality of upper antenna device installation holes 11A and the plurality of lower antenna device installation holes 11B may be disposed vertically. In other words, the plurality of lower antenna device installation holes 11B may be disposed directly under the plurality of upper antenna device installation holes 11A. However, the plurality of lower antenna device installation holes 11B may not be disposed directly under the plurality of upper antenna device installation holes 11A and may be disposed under the plurality of upper antenna device installation holes 11A and disposed at positions spaced apart from the plurality of upper antenna device installation holes 11A in a circumferential direction from the position directly thereunder.

The plurality of upper antenna device installation holes 11A may be spaced apart from each other in the circumferential direction of the support pole 10. In the present embodiment, the plurality of upper antenna device installation holes 11A may be formed as three upper antenna device installation holes 11A spaced apart from each other in the circumferential direction of the support pole 10. However, the number of upper antenna device installation holes 11A is not limited to three and may be two or four or more.

The plurality of lower antenna device installation holes 11B may be disposed under the plurality of upper antenna device installation holes 11A. The plurality of lower antenna device installation holes 11B may be spaced apart from each other in the circumferential direction of the support pole 10. In the present embodiment, the plurality of lower antenna device installation holes 11B may be formed as three lower antenna device installation holes 11B spaced apart from each other in the circumferential direction of the support pole 10. However, the number of lower antenna device installation holes 11B is not limited to three and may be two or four or more.

The antenna devices A1 and A2 may be provided as a plurality of antenna devices A1 and A2 installed in the plurality of antenna device installation holes 11A and 11B, respectively.

Specifically, the plurality of antenna devices A1 and A2 may include the plurality of upper antenna devices A1 and the plurality of lower antenna devices A2.

The plurality of upper antenna devices A1 and the plurality of lower antenna devices A2 may be formed in the same number. However, the plurality of upper antenna devices A1 and the plurality of lower antenna devices A2 may be formed in different numbers.

In addition, the plurality of upper antenna devices A1 and the plurality of lower antenna devices A2 may be formed in the same size. However, the plurality of upper antenna devices A1 and the plurality of lower antenna devices A2 may be formed in different numbers.

Each of the plurality of upper antenna devices A1 may be installed in one of the plurality of upper antenna device installation holes 11A. The plurality of upper antenna devices A1 may be formed in a size capable of covering each of the upper antenna device installation holes 11A when installed on the support pole 10 by passing through each of the plurality of upper antenna device installation holes 11A.

Each of the plurality of lower antenna devices A2 may be installed in one of the plurality of lower antenna device installation holes 11B. The plurality of lower antenna devices A2 may be formed in a size capable of covering each of the lower antenna device installation holes 11B when installed on the support pole 10 by passing through each of the plurality of lower antenna device installation holes 11B.

In order to install the antenna devices A1 and A2 of various sizes, the antenna device installation holes 11A and 11B of various sizes may be installed by being formed. In other words, it is possible to provide an advantage in that antenna devices A1 and A2 from various manufacturers may be intensively installed on the single support pole 10 to be suitable for exteriors of the antenna devices A1 and A2 having different sizes for each manufacturer.

Screw assembly panels 41 fastened to the support pole 10 by screws may be provided at both sides of the antenna devices A1 and A2. The screw assembly panels 41 may be fastened in contact with left and right edge end portions of the antenna device installation holes 11A and 11B by a plurality of screws. A plurality of screw through holes through which the plurality of screws pass may be formed in the screw assembly panel 41, and a plurality of screw fastening holes to which each of the plurality of screws passing through one of the plurality of screw through holes is fastened may be formed in the left and right edge end portions of the antenna device installation holes 11A and 11B of the support pole 10.

In the support pole assembly 1 for antenna installation according to the embodiment of the present disclosure, there is an advantage in that since portions of the rear portions of the antenna devices A1 and A2 may be installed to be embedded into the support pole 10, it is possible to reduce the amounts of protrusion of the antenna devices A1 and A2 protruding outward from the support pole 10, thereby saving the rental cost to the installation space supplier of the antenna devices A1 and A2.

As illustrated in FIG. 6, a plurality of heat sink fins 42 may be formed to protrude from the rear portions of the antenna devices A1 and A2. Here, the rear portions of the antenna devices A1 and A2 may be portions disposed in the internal space of the support pole 10. In addition, the plurality of heat sink fins 42 may function as a heat radiation fin for cooling the antenna devices A1 and A2 in an air-cooled manner by exchanging heat inside the antenna devices A1 and A2 and outside air of the antenna devices A1 and A2 by operations of the antenna devices A1 and A2. In the present embodiment, the plurality of heat sink fins 42 may be formed on rear surfaces of the antenna devices A1 and A2, but may be formed on at least one of upper, lower, left, right, and rear surfaces of the rear portions of the antenna devices A1 and A2.

Since the plurality of heat sink fins 42 may be formed on at least one surface of the rear portions of the antenna devices A1 and A2, the plurality of heat sink fins 42 may be hidden inside the support pole 10 when the antenna devices A1 and A2 are in a state of being installed on the support pole 10. Therefore, since the heat sink fins 42 are not visible from the outside of the support pole 10 when the antenna devices A1 and A2 are installed on the support pole 10, the exterior of the support pole assembly 1 for antenna installation according to the embodiment of the present disclosure can be made beautiful.

Meanwhile, intake panel installation holes 12A and 12B may be further formed in the circumferential surface of the support pole 10. Intake panels 21A and 21B may be further installed on the support pole 10. A plurality of intake holes 22 and 23 may be formed in the intake panels 21A and 21B. The intake panels 21A and 21B may cover the intake panel installation holes 12A and 12B.

The intake panel installation holes 12A and 12B may be formed as the plurality of intake panel installation holes 12A and 12B spaced apart from each other in the circumferential direction of the support pole 10. In the present embodiment, the intake panel installation holes 12A and 12B may be formed as three intake panel installation holes 12A and 12B spaced apart from each other in the circumferential direction of the support pole 10. However, the number of intake panel installation holes 12A and 12B is not limited to three and may be two or four or more.

Specifically, the intake panel installation holes 12A and 12B may include the plurality of upper intake panel installation holes 12A and the plurality of lower intake panel installation holes 12B.

The plurality of upper intake panel installation holes 12A and the plurality of lower intake panel installation holes 12B may be formed in the same number. However, the plurality of upper intake panel installation holes 12A and the plurality of lower intake panel installation holes 12B may be formed in different numbers.

In addition, the plurality of upper intake panel installation holes 12A and the plurality of lower intake panel installation holes 12B may be formed in the same size. However, the plurality of upper intake panel installation holes 12A and the plurality of lower intake panel installation holes 12B may be formed in different sizes.

In addition, the plurality of upper intake panel installation holes 12A and the plurality of lower intake panel installation holes 12B may be disposed vertically. In other words, the plurality of lower intake panel installation holes 12B may be disposed directly under the plurality of upper intake panel installation holes 12A. However, the plurality of lower intake panel installation holes 12B may not be disposed directly under the plurality of upper intake panel installation holes 12A and may be disposed under the plurality of upper intake panel installation holes 12A and disposed at positions spaced apart from the plurality of upper intake panel installation holes 12A in the circumferential direction from the positions directly thereunder.

The plurality of upper intake panel installation holes 12A may be spaced apart from each other in the circumferential direction of the support pole 10. In the present embodiment, the upper intake panel installation hole 12A may be formed as three upper intake panel installation holes 12A spaced apart from each other in the circumferential direction of the support pole 10. However, the number of upper intake panel installation holes 12A is not limited to three and may be two or four or more.

The plurality of lower intake panel installation holes 12B may be formed under the plurality of upper intake panel installation holes 12A. The plurality of lower intake panel installation holes 12B may be spaced apart from each other in the circumferential direction of the support pole 10. In the present embodiment, the lower intake panel installation hole 12B may be formed as three lower intake panel installation holes 12B spaced apart from each other in the circumferential direction of the support pole 10. However, the number of lower intake panel installation holes 12B is not limited to three and may be two or four or more.

The intake panels 21A and 21B may be provided as a plurality of intake panels 21A and 21B installed in the plurality of intake panel installation holes 12A and 12B, respectively.

Specifically, the plurality of intake panels 21A and 21B may include the plurality of upper intake panels 21A and the plurality of lower intake panels 21B.

The plurality of upper intake panels 21A and the plurality of lower intake panels 21B may be formed in the same number. However, the plurality of upper intake panels 21A and the plurality of lower intake panels 21B may be formed in different numbers.

In addition, the plurality of upper intake panels 21A and the plurality of lower intake panels 21B may be formed in the same size. However, the plurality of upper intake panels 21A and the plurality of lower intake panels 21B may be formed in different sizes.

Each of the plurality of upper intake panels 21A may be installed in one of the plurality of upper intake panel installation holes 12A. Each of the plurality of upper intake panels 21A may cover one of the plurality of upper intake panel installation holes 12A when installed on the support pole 10.

Each of the plurality of lower intake panels 21B may be installed in one of the plurality of lower intake panel installation holes 12B. Each of the plurality of lower intake panels 21B may cover one of the plurality of lower intake panel installation holes 12B when installed on the support pole 10.

The plurality of intake holes 22 and 23 may include the plurality of first intake holes 22 formed in each of the plurality of upper intake panels 21A and the plurality of second intake holes formed in each of the plurality of lower intake panels 21B.

The plurality of first intake holes 22 and the plurality of second intake holes 23 may communicate with the inside and outside of the support pole 10. Therefore, air outside the support pole 10 may flow into the internal space of the support pole 10 through the plurality of first intake holes 22 and the plurality of second intake holes 23.

The heat generated within the antenna devices A1 and A2, which is transferred through the heat sink fins 42 of the antenna devices A1 and A2, may form an upward air current after being exchanged with air flowing into the internal space of the support pole 10 through the intake holes 22 and 23 formed in the plurality of intake panels 21A and 21B and may be discharged to the upper portion of the support pole 10.

To this end, it is preferable that the intake panels 21A and 21B are coupled to positions at which the lower portions of the antenna devices A1 and A2 installed in the antenna device installation holes 11A and 11B are vented. To this end, the intake panel installation holes 12A and 12B may be formed under the antenna device installation holes 11A and 11B. Specifically, the upper intake panel installation hole 12A may be formed under the upper antenna device installation hole 11A, and the lower intake panel installation hole 12B may be formed under the lower antenna device installation hole 11B. The upper intake panel installation hole 12A may be formed between the upper antenna device installation hole 11A and the lower antenna device installation hole 11B. The lower antenna device installation hole 11B may be formed under the upper intake panel installation hole 12A.

Therefore, when the antenna devices A1 and A2 are in a state of being installed in the antenna device installation holes 11A and 11B and the intake panels 21A and 21B are in a state of being installed in the intake panel installation holes 12A and 12B, the intake panels 21A and 21B may be disposed under the antenna devices A1 and A2. Specifically, the upper intake panel 21A may be disposed under the upper antenna device A1, and the lower intake panel 21B may be disposed under the lower antenna device A2. The upper intake panel 21A may be disposed between the upper antenna device A1 and the lower antenna device A2. The lower antenna device A2 may be disposed under the upper intake panel 21A.

In the present embodiment, the intake panel installation holes 12A and 12B may be formed to extend from the antenna device installation holes 11A and 11B. In other words, the intake panel installation holes 12A and 12B may be formed to extend downward from a lower side of the antenna device installation holes 11A and 11B. However, the intake panel installation holes 12A and 12B do not necessarily need to extend from the antenna device installation holes 11A and 11B and may be formed separately from the antenna device installation holes 11A and 11B. Of course, when the intake panel installation holes 12A and 12B are formed to extend from the antenna device installation holes 11A and 11B as in the present embodiment, the intake panel installation holes 12A and 12B and the antenna device installation holes 11A and 11B may be perforated through a single perforation process, and thus it is possible to shorten a perforation process time.

Meanwhile, an exhaust panel 25 may be installed on the upper end of the support pole 10. A plurality of exhaust holes 26 may be formed in the exhaust panel 25. The exhaust panel 25 may cover an upper opening of the support pole 10. The exhaust panel 25 may discharge air passing through the plurality of heat sink fins 42 of the antenna devices A1 and A2 from bottom to top to the outside of the support pole 10 through the plurality of exhaust holes 26. Therefore, in the present embodiment, the exhaust panel 25 is installed on the upper end of the support pole 10 and disposed to cover the upper opening of the support pole 10, but the installation position of the exhaust panel 25 is not limited thereto and is possible as long as it is installed above the antenna devices A1 and A2 in the support pole 10.

In other words, the intake panels 21A and 21B may be coupled to the antenna device installation holes 11A and 11B to allow outside air of the support pole 10 to flow into the support pole 10, and the exhaust panel 25 may be coupled to an upper end portion of the support pole 10 to discharge the heat inside the support pole 10 to the outside of the support pole 10.

Therefore, the heat of the antenna devices A1 and A2 radiated through the plurality of heat sink fins 42 of the antenna devices A1 and A2 flows into the support pole 10 through the intake panels 21A and 21B, and smooth heat radiation may be performed through the airflow discharged through the exhaust panel 25.

An exhaust fan 28 (see FIG. 3) may be further disposed in the support pole 10 above the antenna devices A1 and A2. The exhaust fan 28 may send the air in the support pole 10 to the exhaust panel 25.

Since there is a risk that the air flow inside the support pole 10 through the intake panels 21A and 21B may cause resistance due to various reasons, the exhaust fan 28 may smooth the air flow inside the support pole 10.

At least one exhaust fan 28 may be provided. For example, when the exhaust panel 25 is installed on the upper end of the support pole 10 and covers the upper opening of the support pole 10 as in the present embodiment, the exhaust fan 28 may be provided as one exhaust fan 28. Alternatively, when the exhaust panel 25 is installed on a circumferential surface of the upper end portion of the support pole 10, the exhaust fan 28 may be provided as a plurality of exhaust fans 28 disposed to be spaced apart from each other in the circumferential direction of the support pole 10.

Meanwhile, a wire harness (not illustrated) connected to the antenna devices A1 and A2 may be installed in the internal space of the support pole 10. Here, the wire harness may include a power cable for power supply to the plurality of antenna devices A1 and A2, and a control cable for controlling the plurality of antenna devices A1 and A2. In other words, the wire harness may be a cable for power supply and control of the plurality of antenna devices A1 and A2.

In the support pole assembly 1 for antenna installation according to the embodiment of the present disclosure, since the wire harness, which is an element that most significantly deteriorates the beauty of the exterior, is not visible from the outside of the support pole 10 when the antenna devices A1 and A2 are in a state of being installed on the support pole 10, it is possible to prevent damage to the wire harness due to external factors such as bad weather, thereby preventing the power outage of the plurality of antenna devices A.

Meanwhile, a harness clamper 50 (see FIGS. 6 and 7) for clamping and arranging the wire harness may be formed to protrude from an inner circumferential surface of the support pole 10.

The harness clamper 50 may be formed as a plurality of harness clampers 50 disposed to be spaced apart from each other in the circumferential direction of the support pole 10 on the inner circumferential surface of the support pole 10. Since the plurality of heat sink fins 42 of the plurality of antenna devices A1 and A2 face each other inside the support pole 10 when the plurality of antenna devices A1 and A2 are in a state of being installed on the support pole 10, by arranging the wire harness using the harness clamper 50, it is possible to prevent the generation of air flow resistance caused by the wire harness in the internal space of the support pole 10. In addition, since temperatures of the plurality of heat sink fins 42 are very high, the harness clamper 50 can prevent the wire harness from being in direct contact with the plurality of heat sink fins 42, thereby preventing damage to the harness clamper 50 due to the heat of the plurality of heat sink fins 42.

The harness clamper 50 may include a base plate 51 formed to protrude toward a center of the support pole 10 from the inner circumferential surface of the support pole 10, and a clamping protrusion 52 disposed to protrude upward from the base plate 51. The base plate 51 may support the clamping protrusion 52, and the clamping protrusion 52 may be a portion around which the wire harness is wound and may be a substantial portion in which the wire harness is clamped and arranged. The base plate 51 may be formed by cutting a portion of the circumference of the support pole 10 and then being bent to the inside of the support pole 10, and formed separately from the support pole 10 and formed to be coupled to the inner circumferential surface of the support pole 10 by a method such as welding or fastening. The clamping protrusion 52 may be formed as a bolt fastened to the base plate 51 through a nut but is not limited thereto and may be formed as various protrusions in a shape that protrudes upward from the base plate 51.

As described above, in the support pole assembly 1 for antenna installation according to the embodiment of the present disclosure, since the antenna devices A1 and A12 are installed on the support pole 10 by passing through the antenna device installation holes 11A and 11B formed on the circumferential surface of the support pole 10 and covering the antenna device installation holes 11A and 11B and the rear portions of the antenna devices A1 and A2 are disposed in the internal space of the support pole 10, it is possible to reduce the amounts of protrusion of the antenna devices A1 and A2 with respect to the support pole 10, thereby reducing the installation spaces of the antenna devices A1 and A2.

In addition, in the support pole assembly 1 for antenna installation according to the embodiment of the present disclosure, since the rear portions of the antenna devices A1 and A2 are disposed in the internal space of the support pole 10, the plurality of heat sink fins 42 formed on the rear portions of the antenna devices A1 and A2 for heat radiation are not exposed to the outside of the support pole 10, and thus it is possible to make the exterior beautiful.

In addition, in the support pole assembly 1 for antenna installation according to the embodiment of the present disclosure, since the wire harness for power supply and control of the antenna devices A1 and A2 is disposed inside the support pole 10, it is possible to make the exterior beautiful and prevent the power outage of the antenna devices A1 and A2 due to the external factors such as bad weather.

The support pole assembly for antenna installation according to one embodiment of the present disclosure has been described above in detail with reference to the accompanying drawings. However, it goes without saying that the embodiments of the present disclosure are not necessarily limited by the above-described embodiments, and various modifications and implementation within the equivalent scope are possible by those skilled in the art to which the present disclosure pertains. Therefore, the true scope of the present disclosure will be determined by the appended claims.

INDUSTRIAL APPLICABILITY

The present disclosure provides a support pole assembly for antenna installation, which can reduce an installation space of an antenna device by reducing the amount of protrusion of the antenna device with respect to the support pole when the antenna device is installed on the support pole.

The invention claimed is:

1. A support pole assembly for antenna installation, comprising:

a support pole which is formed in a hollow structure and in which an antenna device installation opening is formed in a circumferential surface thereof;

an antenna device which is installed on the support pole by passing through the antenna device installation opening and covering the antenna device installation opening and of which a rear portion is disposed in an internal space of the support pole; and an exhaust fan disposed above the antenna device in the support pole and configured to send air in the support pole to the exhaust panel, wherein a plurality of heat sink fins are formed to protrude from a rear portion of the antenna device disposed within the internal space of the support pole, an intake panel having a plurality of intake holes is arranged below the antenna device on the circumferential surface of the support pole, and an exhaust panel having a plurality of exhaust holes is arranged above the antenna device, the air introduced through the intake holes flows upwardly along the heat-sink fins within the internal space of the support pole and is discharged through the exhaust holes.

2. The support pole assembly of claim 1, wherein an intake panel installation opening is formed to extend from the antenna device installation opening.

3. The support pole assembly of claim 1, wherein an exhaust panel is installed above the antenna device in the support pole and in which a plurality of exhaust holes are formed.

4. The support pole assembly of claim 3, wherein the exhaust panel is installed on an upper end of the support pole and covers an upper opening of the support pole.

5. The support pole assembly of claim 1, wherein a wire harness connected to the antenna device is installed in the internal space of the support pole.

6. The support pole assembly of claim 5, wherein a harness clamper configured to clamp and arrange the wire harness is formed to protrude from an inner circumferential surface of the support pole.

7. The support pole assembly of claim 6, wherein the harness clamper includes:

a base plate formed to protrude toward a center of the support pole from the inner circumferential surface of the support pole; and a clamping protrusion which is disposed to protrude upward from the base plate and around which the wire harness is clamped and arranged.

8. The support pole assembly of claim 1, wherein screw assembly panels fastened to the support pole by a screw are provided at both sides of the antenna device.

9. The support pole assembly of claim 1, wherein the antenna device installation opening is formed as a plurality of antenna device installation openings spaced apart from each other in a circumferential direction of the support pole, and the antenna device is provided as a plurality of antenna devices each installed in one of the plurality of antenna device installation openings.

10. The support pole assembly of claim 9, wherein the plurality of antenna device installation openings include:

a plurality of upper antenna device installation holes openings spaced apart from each other in the circumferential direction of the support pole; and a plurality of lower antenna device installation openings formed under the plurality of upper antenna device installation openings and spaced apart from each other in the circumferential direction of the support pole, and the plurality of antenna devices include:

a plurality of upper antenna devices each installed in one of the plurality of upper antenna device installation openings; and a plurality of lower antenna devices each installed in one of the plurality of lower antenna device installation openings.

11. The support pole assembly of claim 1, wherein at least one of a local advertising emblem, an advertising panel, a road information board, a traffic light, and a streetlight is further installed on the support pole.

* * * * *